Dec. 1, 1964  H. A. DONKO  3,159,788
SUPPRESSED WIDE SCALE ELECTRO-MAGNETIC GAUGE
Original Filed April 4, 1960  3 Sheets-Sheet 1

INVENTOR
HAROLD A. DONKO

BY John C. Black
ATTORNEY

Dec. 1, 1964 H. A. DONKO 3,159,788
SUPPRESSED WIDE SCALE ELECTRO-MAGNETIC GAUGE
Original Filed April 4, 1960 3 Sheets-Sheet 2
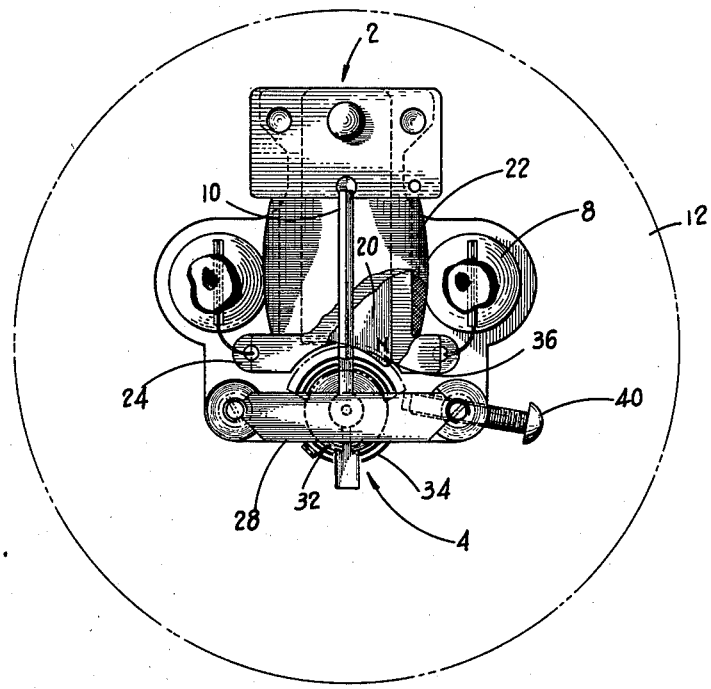
FIG. 3.
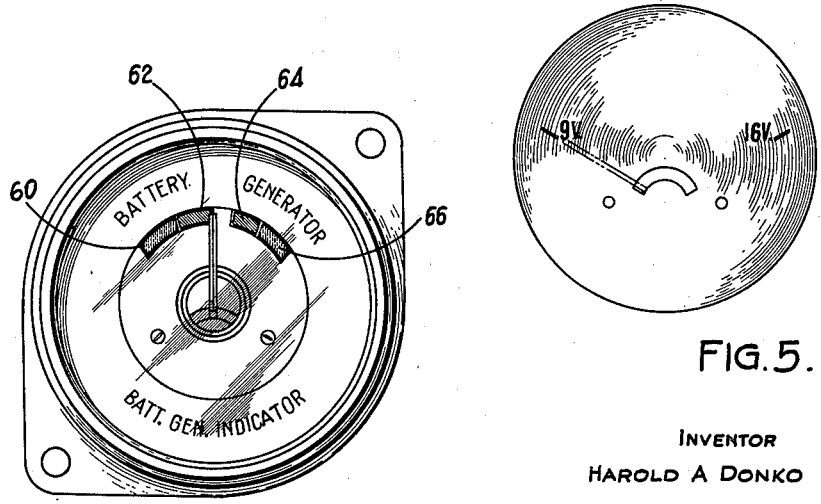
FIG. 6.
FIG. 5.
INVENTOR
HAROLD A DONKO
BY John C Black
ATTORNEY Dec. 1, 1964  H. A. DONKO  3,159,788
SUPPRESSED WIDE SCALE ELECTRO-MAGNETIC GAUGE
Original Filed April 4, 1960  3 Sheets-Sheet 3

INVENTOR
HAROLD A. DONKO

BY John C Black
ATTORNEY

United States Patent Office 3,159,788
Patented Dec. 1, 1964

3,159,788
SUPPRESSED WIDE SCALE ELECTRO-
MAGNETIC GAUGE
Harold A. Donko, Chicago, Ill., assignor to Stewart-
Warner Corporation, Chicago, Ill., a corporation of
Virginia
Continuation of application Ser. No. 19,543, Apr. 4, 1960.
This application June 14, 1962, Ser. No. 205,166
6 Claims. (Cl. 324—146)

This invention relates generally to electromagnetic gauges and more particularly to a wide scale voltmeter of the type in which maximum rate of deflection occurs in a central portion of the overall available range. This application is a continuation of application 19,543, filed April 4, 1960, now abandoned.

The improved gauge of the present application has been particularly adapted for measuring the voltage of an electrical storage battery thereby to determine its state of charge. This type of gauge may be installed in automotive vehicles to measure the battery charge, to measure the output voltage of the voltage regulator, and also to confirm the battery charge by discharging the battery through a standard load whereby the true condition of the battery can be determined.

The gauge is connected across the battery terminals. When the ignition system is turned off, it measures the battery voltage thereby to indicate the instantaneous charge of the battery. When the ignition system is turned on and the engine starter is energized, the current drain through the starter will cause a decrease in the battery voltage which decrease is indicated by the gauge. The magnitude of this decrease will indicate the true condition of the battery. In the event that the battery is in good condition, the decrease in voltage will be relatively small. However, as the battery condition becomes worse, for example, due to a dead cell, the decrease in voltage will become appreciably magnified.

While the engine is running at a speed such that the output of the voltage regulator is higher than the battery voltage, the gauge will indicate this output voltage. This information is utilized to give a warning of an unduly high or low voltage regulator output which can be detrimental to the battery. In addition, the improved gauge, by reason of its accuracy and wide range spread at the desired voltage regulator setting, can now be used for adjusting the voltage regulator to the desired output value. The voltage regulator is connected in a well known manner across the vehicle generator for the purpose of limiting the output voltage of the vehicle generator.

The prior art devices in this area of use fall into two general catagories. Expensive, precision instruments of the D'Arsonval-type are most commonly used. Where economy has been the primary factor, the suppliers of equipment of this type have generally resorted to the lower cost, moving armature, gauge-type meter. However, in each instance, the lower cost gauges have been subject to inaccuracy, restricted range, and/or instability in certain portions of the scale.

In the most economical approach so far devised, the gauge is characterized by a rotatable disk-like permanent magnet, an electromagnetic coil disposed adjacent the magnet on an axis generally perpendicular to that of the magnet, and a flat core within the coil forming a pole piece adjacent to and in the same plane as the magnet. As first designed however, the gauge had only a very small usable range. This first design was subsequently improved to extend the usable scale to in the order of 50° maximum magnet movement. If the range was extended beyond this point, instability at the mid-scale was encountered. Because of limited scale, tendency toward instability and serious calibration problems, this approach has never reached wide commercial acceptance.

Applicant's invention is directed to this latter type device.

It is, therefore, a primary object of the present invention to provide a low cost instrument of the type last described which provides a wide scale deflection with reliable accuracy and stability in all portions thereof. In the preferred embodiment, this is accomplished by an improved design including the positioning of an adjusting screw of a magnetic material closely adjacent the magnet such that the one pole of the magnet having a polarity the same as the adjacent pole piece when the coil is energized is closest to the screw approximately at mid-scale. It has been found that by adjusting the screw closer to or further away from the magnet, the scale spread for a given voltage range may be decreased or increased to the desired angular spread. In this manner, calibration of the gauge is simply and accurately achieved. In addition, stability of operation is now assured.

It is a more specific object of the present invention to provide, in an instrument of the type in which a spring biased magnet is rotated adjacent a flat coplanar pole piece as a function of current in a coil encircling the pole piece, an adjustable soft iron screw positioned closely adjacent that pole of the magnet which is adjacent the pole piece. In the preferred embodiment, the said magnet pole is closest to the screw approximately in its mid-scale position.

It is another object of the present invention to provide an improved means for decreasing magnetic lag in a magnetic core gauge of the type described. Magnetic lag is a well known term used to denote the difference in scale readings per given value of energized current between forward and return movements of the pointer. It is generally caused by hysteresis motion in the magnetic circuits with a minor contribution by mechanical friction between the moving parts. In the preferred embodiment, this result is obtained by the use of the calibrating screw which has been found to minimize the magnetic lag of the core.

Other objects and the many features of the invention will be evident upon a perusal of the following description taken in conjunction with the accompanying drawings in which:

FIG. 3 is a plan view of the gauge partially broken away;

FIGS. 4 to 6 show a few scales which are available with the improved gauge;

Figure 1:
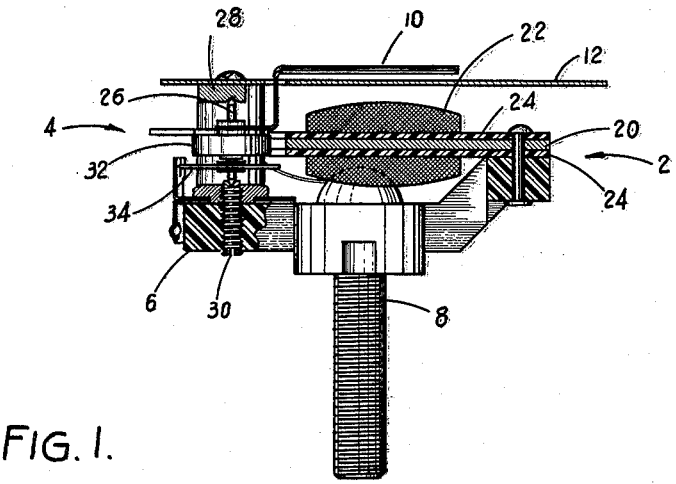
FIG. 1 is a side elevation view of the improved gauge.
Figure 2:
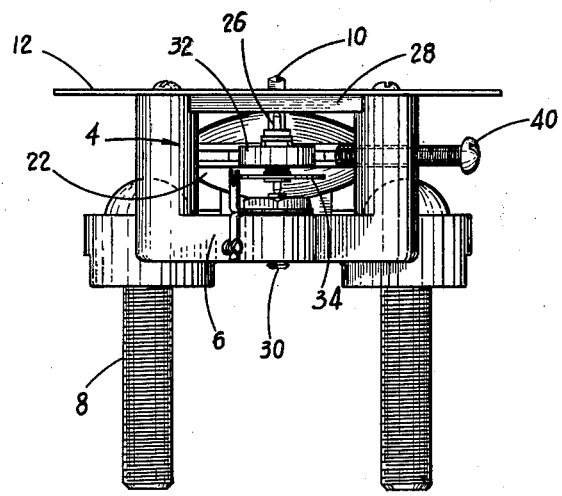
FIG. 2 is a front elevation view of the gauge.
Figure 10:
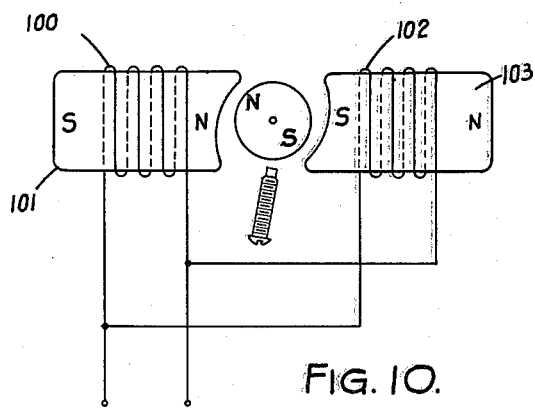
Figure 11:
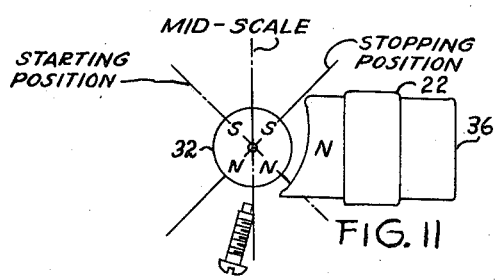

FIGS. 7 to 10 diagrammatically show modifications of the embodiment of FIGS. 1 to 3; and FIG. 11 diagrammatically shows the preferred embodiment of the invention.

Briefly, the improved gauge of FIGS. 1–3 includes an electromagnetic coil and core assembly 2 and a magnet assembly 4. Each of the assemblies is suitably secured to a mounting bracket 6 made of an insulating material. Conventional mounting studs 8 are carried by the bracket 6 and a pointer 10 is secured to and rotatable with the magnet assembly 4. A calibrated face dial 12 is secured to the bracket 6. A suitable scale on the dial face 12 cooperates with the pointer 10 to indicate voltage in a well known manner.

The assembly 2 comprises an elongated flat core 20 of a magnetic material. A coil 22 is received about a central portion of the core 20. A pair of insulating sheets 24 and 26 are interposed between the core and coil.

The assembly 4 comprises a pivot shaft 26 rotatably carried in an upper bearing bracket 28 and a lower screw-type adjusting bearing 30. A disk-like permanent magnet 32 and an adjustable biasing spring 34 are secured to the pivot shaft in a well known manner for rotation therewith. The pointer 10 is also secured to the shaft for rotation with the magnet.

As best seen in FIG. 3 the lower end or pole 36 of the magnet core 20 is not concentric with the adjacent periphery of the magnet 32. The pole slopes gently away from the adjacent magnet periphery as it progresses toward the left.

The upper bearing bracket 28 also serves as a zero stop for the pointer 10. When the pointer is in the zero position the poles of the magnet 32 are aligned in a plane extending generally toward the right-hand end (FIG. 3) of the pole 36 with the north of the magnet adjacent the core pole 36. A screw 40 of a nonpermanent magnetic material is carried by the bracket 6 in the plane of the permanent magnet and the core for adjustment toward or away from the magnet at a position slightly clockwise (FIG. 3) from the adjacent pole of the magnet. The coil is energized in a manner which produces a magnetic pole at 36 of the same polarity as the adjacent pole of the magnet, for example, north. It will be appreciated that this pole could be made a south pole if the poles of the magnet are similarly reversed.

A preferred spacing between the adjacent edges of the pole 36 and the magnet 32 is in the order of .070" although it may be reduced at least to .030". If the spacing is unduly increased, the sensitivity of the meter will be decreased.

Ease of calibration operation of the improved gauge has been found to exist with the screw 40 being adjusted to a position preferably in the order of .040" to .140". As the screw is brought closer to the magnet, the change in angular deflection of the magnet and pointer is more restricted for a given change in voltage input to the coil. As the screw is moved further from the magnet, the change in deflection of the magnet and pointer increases for a given change in voltage input. Hence the desired scale spread may be determined by adjustment of the screw closer to or further away from the magnet. In typical mass production manufacture of the gauge, the strength of the magnet from gauge to gauge will not be exactly the same. In order to prevent error in scale reading because of variances in magnet strength, the screw is adjusted closer to or further away from the magnet to completely compensate for changes in the magnet strength.

In addition, the spacing between the screw and magnet affects the magnetic lag of the gauge. The closer the screw is brought to the magnet, the smaller the overall gauge lag. A desirable spacing between the magnet and screw for excellent gauge operation has been found to be in the order of .090". Hence it is possible to design the gauge for a theoretical spacing of .090" and permit slight adjustment closer or away from the magnet to compensate for differences from gauge to gauge caused by mass production manufacturing tolerances.

Figure 4:
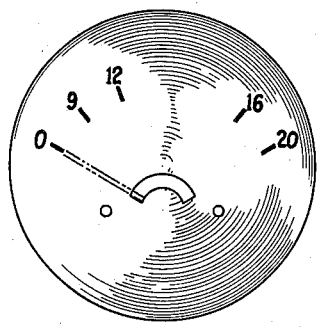

FIG. 4 shows a typical scale for which the present gauge is particularly advantageous. The extreme ends of the scale, 0–9 volts and 16–20 volts, are compressed while the central portion of the scale, 9–16 volts, is expanded. The 120° scale spread shown in FIG. 4 is readily available in the present gauge. However, for many commercial applications, a 90° scale spread has been found to be popular.

FIG. 5 shows a second scale in which the biasing spring 34 is preloaded to prevent movement of the pointer below 9 volts. Thus a wide 9–16 volt scale may be provided. Again the extreme ends of the scale will be compressed and the central portion will be expanded. A particularly advantageous use of the improved gauge having this preloaded spring characteristic is a gauge designed for an approximately 1½–3 volt range for testing the condition of individual cells in storage batteries.

The scale of FIG. 6 is the typical vehicle gauge scale for use on trucks and the like. The voltage values measured will be similar to those shown in FIG. 4, that is 0–9, 9–12, 12–16, and 16–20 with a 90° total scale spread. Instead of numerals, however, color coded arcuate sections are used. Thus the red colored arc 60 covers the range of approximately 9 volts to 12 volts. The green arcs 62 and 64 respectively cover the ranges approximately from 12 volts to 13 volts and 13.8 volts to 14.7 volts. The red colored arc 66 covers the range approximately from 14.8 volts to 16 volts. In an ignition system using a 12 volt battery the voltage regulator is preferably set for a maximum output in the order of 14.7 volts. However, as the ambient temperature in which it operates increases, the output voltage of the regulator may decrease to an acceptable minimum voltage in the order of 13.8 volts. If the output is substantially lower than the 13.8 volts, undue battery drain will occur and if it is substantially above 14.7 volts damage to the battery will result. Hence an acceptable range other than a single point is provided for indicating the output of the voltage regulator for winter-summer operation.

The method of calibrating the improved gauge will now be described in detail with respect to the scale of FIG. 6. The coil 22 is connected to a 9 volt source. The bias spring 34 is adjusted to bring the pointer in line with the 9 volt setting. The coil is then connected to a 16 volt source. If the pointer is at a position corresponding to a value less than 16 volts, the screw 40 is adjusted to raise the pointer to a position midway between the position it assumed when energized with the 16 volt source and the scale position corresponding to 16 volts. The bias spring 34 is then adjusted to raise the pointer to the scale position corresponding to 16 volts. Since the screw attracts the magnet in opposite rotational directions on either side of the mid-scale position (approximately 13.5 volts) the pointer will return exactly to the same scale position corresponding to 9 volts when it is again connected to the 9 volt source. That is, the second spring adjustment and the one screw adjustment to raise the pointer to the 16 volt scale position compensate for each other on the lower half of the scale to leave the adjustment for the lower half of the scale substantially unchanged.

In operation, the coil 22 is connected across the potential source which it is desired to measure. For example, the output of a vehicle voltage regulator. The pole 36, which is of the same polarity as the adjacent magnet pole, repels the magnet to urge it in a clockwise direction (FIG. 3). The greater the current in coil 22 the greater the magnetic potential of the pole 36 and the greater the angular displacement of the magnet.

When the pointer is in approximately its mid-scale position, the poles of the magnet 32 will be substantially perpendicular to the direction of flux produced by the coil 22 as shown in FIG. 11. When the poles are so aligned at right angles to the external flux, their angular displacement per unit change in flux is greatest. However, as the magnet moves in either direction from this mid-scale position, the poles become aligned in planes defining progressively smaller angles with the direction of external flux. It is for this reason that the scale of the improved gauge tends to be expanded in its central portion and compressed at its extreme ends.

Figure 7:
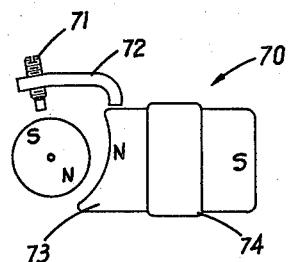

FIG. 7 shows an alternative embodiment 70 which is otherwise similar to the embodiment of FIGS. 1–3 except that the adjusting screw 71 is placed in a substantially diametrically opposite position and is carried by a nonpermanent magnetic arm 72 disposed adjacent the north pole of the core 73. The coil is shown at 74. This embodiment does not appear to provide as much of a reduction in magnetic lag as does the embodiment of FIGS. 1–3.

Figure 8:
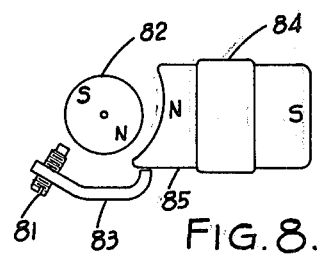

FIG. 8 discloses a further embodiment which is otherwise similar to that of FIGS. 1–3 except that the adjusting screw 81 stands approximately midway between the poles of the magnet 82 and is supported by a nonpermanent magnetic arm 83. The coil and core are shown at 84 and 85. In this embodiment, the screw 81 in all angular positions of the magnet resists further movement of the magnet in response to higher values of current in the coil.

Figure 9:
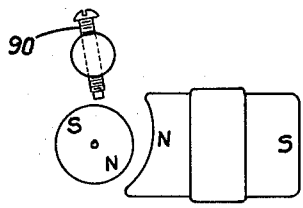

FIG. 9 shows another embodiment which is otherwise similar to that of FIGS. 1–3 except that the adjusting screw 90 is placed in a substantially diametrically opposite position.

FIG. 10 shows another embodiment which is otherwise similar to that of FIGS. 1–3 except that a second coil 100 and a second core 101 are disposed diametrically opposite a first coil 102 and a pole piece 103. The coils 100 and 102 are connected in parallel. This embodiment permits full scale deflection of the pointer with a substantially smaller current drain.

While there have been described what are at present believed to be the preferred embodiments of the invention, it will be understood that various changes and modifications may be made therein; and it is contemplated to cover in the appended claims all such changes and modifications as fall within the true spirit and scope of the invention.

What is claimed is:

1. A wide scale milliammeter movement for measuring uni-directional electric current comprising a permanent magnet having diametrically opposed poles, means mounting said magnet for rotation about an axis between said poles from a starting position to a stopping position and biasing said magnet to its starting position, an electromagnetic structure including a coil and a substantially flat magnetic core generally coplanar with said magnet and having a pole piece with a generally curved pole face eccentrically aligned with the path of travel of one of the poles of said magnet to define a continuously increasing air gap therewith in a direction opposite to the direction of rotation from the starting position to the stopping position, said pole face having one end closest to said path of travel opposite one pole of the magnet and its other end furthest from the path of travel at a point intermediate the poles of the magnet when the magnet is in its starting position, said coil adapted to induce at said pole face a magnetic pole or like polarity to said one magnet pole responsive to said uni-directional current, and an element of nonpermanent magnetic material adjustably disposed adjacent to and adjustable away from and towards the path of travel of one of the magnet poles at a position substantially centered between the starting and stopping positions of one of the poles of said magnet.

2. A wide scale milliammeter movement for measuring uni-directional current comprising a disk-like permanent magnet having diametrically opposed poles, means mounting said magnet for rotation about an axis between said poles from a starting position to a stopping position and biasing said magnet to its starting position, an electromagnetic structure including a coil and a flat magnetic core generally coplanar with said magnet and having a pole piece with a generally curved pole face eccentrically aligned with the periphery of said magnet to define a continuously increasing air gap therewith in a direction opposite to the direction of rotation from the starting position to the stopping position, said pole face having one end closest to said magnet opposite one pole thereof and its other end furthest from the magnet at a point intermediate the poles of the magnet when the magnet is in its starting position, said coil adapted to induce at said pole face a magnetic pole of like polarity to said one magnet pole responsive to said uni-directional current, a screw of nonpermanent magnetic material adjustably disposed closely adjacent the periphery of the magnet at a position substantially centered between the starting and stopping positions of said one pole of said magnet, and means supporting the screw for calibration adjustment toward and away from the magnet.

3. A wide scale milliammeter movement for measuring uni-directional electric current comprising a disk-like permanent magnet having diametrically opposed poles, means mounting said magnet for rotation about an axis between said poles from a starting position to a stopping position and biasing said magnet to its starting position, an electromagnetic structure including a coil and a flat magnetic core generally coplanar with said magnet and having a pole piece with a generally curved pole face eccentrically aligned with the periphery of said magnet to define a continuously increasing air gap therewith in a direction opposite to the direction of rotation from the starting position to the stopping position, said pole face having one end closest to said magnet opposite one pole thereof and its other end furthest from the magnet at a point intermediate the poles of the magnet when the magnet is in its starting position, said coil adapted to induce at said pole face a magnetic pole of like polarity to said one magnet pole responsive to said uni-directional current, a screw of nonpermanent magnetic material adjustably disposed closely adjacent the periphery of the magnet at a position substantially centered between the starting and stopping positions of the other pole of said magnet, and means supporting the screw for calibration adjustment toward and away from the magnet.

4. The movement of claim 3 in which the supporting means comprises an element of nonpermanent magnetic material supporting the screw adjacent one end thereof and having its other end in close proximity to the one pole of the core.

5. A wide scale milliammeter movement for measuring uni-directional electric current comprising a disk-like perment magnet having diametrically opposed poles, means mounting said magnet for rotation about an axis between said poles from a starting position to a stopping position through a range in the order of 80° to 120° and biasing said magnet to its starting position, an electromagnetic structure including a coil and a flat magnetic core generally coplanar with said magnet and having a pole piece with a generally curved pole face eccentrically aligned with the periphery of said magnet to define a continuously increasing air gap therewith in a direction opposite to the direction of rotation from the starting position to the stopping position, said pole face having one end closest to said magnet opposite one pole thereof and its other end furthest from the magnet at a point intermediate the poles of the magnet when the magnet is in its starting position, said coil adapted to induce at said pole face a magnetic pole of like polarity to said one magnet pole responsive to said uni-directional current, a screw of nonpermanent magnetic material adjustably disposed closely adjacent the periphery of the magnet at a position substantially centered between the starting and stopping positions of said one pole of said magnet, and means supporting the screw for movement toward and away from the magnet to form a desired spacing in a range in the order of .040″ to .140″ for calibrating the mechanism.

6. A wide scale milliammeter movement for measuring uni-directional electric current comprising a disk-like permanent magnet having diametrically opposed poles, means mounting said magnet for rotation about an axis between said poles from a starting position as defined by the at rest position of one of said poles to a stopping position through an angle of the order of 90° and biasing said magnet to its starting position, an electromagnetic structure including a coil and a flat magnetic core generally coplanar with said magnet and having a pole piece with a generally curved pole face eccentrically aligned with an arc of the periphery of said magnet subtended by an angle in the order of 45° to define a continuously increasing air gap therewith in a direction opposite to the direction of rotation from the starting position to the stopping position, said pole face having one end spaced in the order of .070″ from one pole of said magnet when the magnet is in its starting position, said coil adapted to induce at said pole face a magnetic pole of like polarity to said one magnet pole responsive to said uni-directional current, a screw of nonpermanent magnetic material disposed closely adjacent to and adjustable away from and towards the periphery of the magnet at a position substantially centered between the starting and stopping positions of said one pole of said magnet, and means supporting the screw for movement toward and away from the magnet to form a desired spacing in a range in the order of .040″ to .140″ for calibrating the mechanism.

References Cited in the file of this patent
UNITED STATES PATENTS

| | | |
|---|---|---|
| 2,175,046 | Warner | Oct. 3, 1939 |
| 2,817,816 | Medlar | Dec. 24, 1957 |